United States Patent
Li

(10) Patent No.: US 12,532,345 B2
(45) Date of Patent: Jan. 20, 2026

(54) FREQUENCY DOMAIN RESOURCE ALLOCATION METHOD, DEVICE AND STORAGE MEDIUM

(71) Applicant: TCL COMMUNICATION (NINGBO) CO., LTD., Zhejiang (CN)

(72) Inventor: Zhiyuan Li, Zhejiang (CN)

(73) Assignee: TCL COMMUNICATION (NINGBO) CO., LTD., Zhejiang (CN)

( * ) Notice: Subject to any disclaimer, the term of this patent is extended or adjusted under 35 U.S.C. 154(b) by 352 days.

(21) Appl. No.: 18/250,362

(22) PCT Filed: Dec. 4, 2020

(86) PCT No.: PCT/CN2020/133891
§ 371 (c)(1),
(2) Date: Apr. 25, 2023

(87) PCT Pub. No.: WO2022/088388
PCT Pub. Date: May 5, 2022

(65) Prior Publication Data
US 2023/0422287 A1    Dec. 28, 2023

(30) Foreign Application Priority Data
Oct. 26, 2020    (CN) .......................... 202011154825.0

(51) Int. Cl.
*H04W 72/542* (2023.01)
*H04L 5/00* (2006.01)
(Continued)

(52) U.S. Cl.
CPC .......... *H04W 72/542* (2023.01); *H04L 5/0048* (2013.01); *H04W 72/0453* (2013.01); *H04W 72/40* (2023.01); *H04W 72/56* (2023.01)

(58) Field of Classification Search
None
See application file for complete search history.

(56) References Cited

U.S. PATENT DOCUMENTS 8,605,644 B2 * 12/2013 Wang .................. H04W 52/325
    455/452.2
2006/0251180 A1 * 11/2006 Baum .................. H04L 1/20
    375/260
(Continued)

FOREIGN PATENT DOCUMENTS

| CN | 101790237 A | 7/2010 |
| CN | 102036390 A | 4/2011 |

(Continued)

OTHER PUBLICATIONS

Written Opinion of the International Search Authority in international application No. PCT/CN2020/133891, mailed on Jul. 26, 2021.
(Continued)

*Primary Examiner* — Steve R Young
(74) *Attorney, Agent, or Firm* — PV IP PC; Wei Te Chung

(57) ABSTRACT

The present application discloses a frequency domain resource allocation method, device and storage medium. The frequency domain resource allocation method is applied to a Vehicle-to-X (V2X) terminal and includes obtaining a pre-configured resource pool, which comprises a plurality of subchannels; calculating a signal-to-noise ratio (SNR) of each subchannel in the resource pool; determining priority of each subchannel in the resource pool according to the SNR; and selecting the subchannel with a highest priority from the resource pool as a frequency domain resource for physical sidelink shared channel (PSSCH).

9 Claims, 5 Drawing Sheets

(51) Int. Cl.
*H04W 72/0453* (2023.01)
*H04W 72/40* (2023.01)
*H04W 72/56* (2023.01)

(56) References Cited

U.S. PATENT DOCUMENTS

| | | | | |
|---|---|---|---|---|
| 2007/0155323 | A1* | 7/2007 | Matsumoto | H04L 5/0044 455/39 |
| 2011/0051599 | A1* | 3/2011 | Tanigawa | H04L 1/04 370/225 |
| 2016/0255656 | A1* | 9/2016 | Lou | H04L 1/1887 370/335 |
| 2018/0027499 | A1* | 1/2018 | Dang | H04W 52/146 455/522 |
| 2019/0036738 | A1 | 1/2019 | Miao et al. | |
| 2019/0053267 | A1* | 2/2019 | Kim | H04W 76/14 |
| 2019/0149365 | A1 | 5/2019 | Chatterjee et al. | |

FOREIGN PATENT DOCUMENTS

| | | |
|---|---|---|
| CN | 106028453 A | 10/2016 |
| CN | 107277922 A | 10/2017 |
| CN | 110431893 A | 11/2019 |
| CN | 110710295 A | 1/2020 |
| CN | 110912658 A | 3/2020 |
| CN | 111435909 A | 7/2020 |
| CN | 111436118 A | 7/2020 |
| CN | 111565405 A | 8/2020 |
| CN | 111630920 A | 9/2020 |
| WO | 2018030791 A1 | 2/2018 |
| WO | 2020033719 A1 | 2/2020 |
| WO | 2020210333 A1 | 10/2020 |

OTHER PUBLICATIONS

International Search Report in International application No. PCT/CN2020/133891, mailed on Jul. 26, 2021.
Chinese Office Action issued in corresponding Chinese Patent Application No. 202011154825.0 dated Apr. 26, 2022, pp. 1-8.

* cited by examiner

FREQUENCY DOMAIN RESOURCE ALLOCATION METHOD, DEVICE AND STORAGE MEDIUM

This application claims the priority of International Application No. PCT/CN2020/133891, filed Dec. 4, 2020, which claims priority to Chinese Application No. 202011154825.0, filed on Oct. 26, 2020. The entire disclosures of each of the applications are incorporated herein by reference.

TECHNICAL FIELD

The present application relates to communication technologies, and more particularly to a frequency domain resource allocation method, device and storage medium.

BACKGROUND ARTS

Vehicle to X (V2X) is an important application scenario in 5G. V2X adopts SideLink (edge connection, sidelink connection) in ProSe (short-range communication) technology to realize direct communication between V2X terminals. SideLink is based on 5G air interface, NR technology (NR V2X), which meets V2X requirements of low latency, high reliability and high speed.

SideLink has developed to four transmission modes TM1, TM2, TM3 and TM4 so far. Among them, TM2 and TM4 are transmission modes in areas with no signal coverage. In these transmission modes, the base station cannot schedule frequency domain resources for physical sidelink shared channel (PSSCH), and the V2X terminals can only randomly select frequency domain resources from a pre-configured resource pool. However, the channel for each subcarrier of the bandwidth has different properties. If the frequency domain resources are randomly selected for PSSCH, transmission reliability may be degraded.

Technical Problems

The embodiments of the present application provide a frequency domain resource allocation method, device and storage medium, which can allocate optimal frequency domain resources to PSSCH and improve transmission reliability.

Technical Solutions

The present application provides a frequency domain resource allocation method, applied to a Vehicle-to-X (V2X) terminal, the method including:
  obtaining a pre-configured resource pool, which includes a plurality of subchannels;
  calculating a signal-to-noise ratio (SNR) of each subchannel in the resource pool;
  determining priority of each subchannel in the resource pool according to the SNR; and
  selecting the subchannel with a highest priority from the resource pool as a frequency domain resource for physical sidelink shared channel (PSSCH).

In some embodiments of the present application, each subchannel includes a plurality of subcarriers;
  the calculating the signal-to-noise ratio of each subchannel in the resource pool includes:
    taking each subchannel of the resource pool as a target subchannel, and calculating a signal-to-interference-plus-noise ratio (SINR) of each subcarrier in the target subchannel; and
    calculating the SNR of the target subchannel according to the SINR of a plurality of subcarriers in the target subchannel.

In some embodiments of the present application, the calculating the SNR of the target subchannel according to the SINR of the plurality of subcarriers in the target subchannel includes:
  mapping the SINR of the plurality of subcarriers in the target subchannel to the SNR of the target subchannel according to an equivalent SNR function.

In some embodiments of the present application, the equivalent SNR function is:

$$SNR_{eff} = \beta \ln^{-1}\left(\frac{1}{R}\sum_{r=1}^{R} \exp\left(\frac{SINR_r}{\beta}\right)\right);$$

wherein $SNR_{eff}$ is the SNR of the target subchannel, R is the number of subcarriers in the target subchannel, $SINR_r$ is the SINR of a r-th subcarrier in the target subchannel, and $\beta$ is an adjustment factor.

In some embodiments of the present application, the determining the priority of each subchannel in the resource pool according to the SNR includes:
  sorting the plurality of subchannels in the resource pool in descending order of the SNR; and
  setting the priorities of the plurality of subchannels in the resource pool in descending order of priorities according to the sorting.

The present application further provides a frequency domain resource allocation device, applied to a Vehicle-to-X (V2X) terminal, the device including:
  an obtaining module, configured for obtaining a pre-configured resource pool, which includes a plurality of subchannels;
  a calculating module, configured for calculating a signal-to-noise ratio (SNR) of each subchannel in the resource pool;
  a determining module, configured for determining priority of each subchannel in the resource pool according to the SNR; and
  a selecting module, configured for selecting the subchannel with a highest priority from the resource pool as a frequency domain resource for physical sidelink shared channel (PSSCH).

In some embodiments of the present application, each subchannel includes a plurality of subcarriers;
  the calculating module includes:
    a SINR calculating unit, configured for taking each subchannel of the resource pool as a target subchannel, and calculating a signal-to-interference-plus-noise ratio (SINR) of each subcarrier in the target subchannel; and
    a SNR calculating unit, configured for calculating the SNR of the target subchannel according to the SINR of a plurality of subcarriers in the target subchannel.

In some embodiments of the present application, the SNR calculating unit is configured for:
  mapping the SINR of the plurality of subcarriers in the target subchannel to the SNR of the target subchannel according to an equivalent SNR function.

In some embodiments of the present application, the equivalent SNR function is:

$$SNR_{eff} = \beta \ln^{-1}\left(\frac{1}{R}\sum_{r=1}^{R} \exp\left(\frac{SINR_r}{\beta}\right)\right);$$

wherein $SNR_{eff}$ is the SNR of the target subchannel, R is the number of subcarriers in the target subchannel, $SINR_r$ is the SINR of a r-th subcarrier in the target subchannel, and β is an adjustment factor.

In some embodiments of the present application, the determining module is configured for:

sorting the plurality of subchannels in the resource pool in descending order of the SNR; and setting the priorities of the plurality of subchannels in the resource pool in descending order of priorities according to the sorting.

The present application further provides a computer readable storage medium, wherein the storage medium stores a plurality of instructions applicable to be loaded by a processor to execute the following steps:

obtaining a pre-configured resource pool, which includes a plurality of subchannels;

calculating a signal-to-noise ratio (SNR) of each subchannel in the resource pool;

determining priority of each subchannel in the resource pool according to the SNR; and selecting the subchannel with a highest priority from the resource pool as a frequency domain resource for physical sidelink shared channel (PSSCH).

In some embodiments of the present application, each subchannel includes a plurality of subcarriers;

when executing the calculating the signal-to-noise ratio of each subchannel in the resource pool, the processor executes the steps of:

taking each subchannel of the resource pool as a target subchannel, and calculating a signal-to-interference-plus-noise ratio (SINR) of each subcarrier in the target subchannel; and calculating the SNR of the target subchannel according to the SINR of a plurality of subcarriers in the target subchannel.

In some embodiments of the present application, when executing the calculating the SNR of the target subchannel according to the SINR of the plurality of subcarriers in the target subchannel, the processor executes the step of:

mapping the SINR of the plurality of subcarriers in the target subchannel to the SNR of the target subchannel according to an equivalent SNR function.

In some embodiments of the present application, the equivalent SNR function is:

$$SNR_{eff} = \beta \ln^{-1}\left(\frac{1}{R}\sum_{r=1}^{R} \exp\left(\frac{SINR_r}{\beta}\right)\right),$$

wherein $SNR_{eff}$ is the SNR of the target subchannel, R is the number of subcarriers in the target subchannel, $SINR_r$ is the SINR of a r-th subcarrier in the target subchannel, and β is an adjustment factor.

In some embodiments of the present application, when executing the determining the priority of each subchannel in the resource pool according to the SNR, the processor executes the steps of:

sorting the plurality of subchannels in the resource pool in descending order of the SNR; and setting the priorities of the plurality of subchannels in the resource pool in descending order of priorities according to the sorting.

Beneficial Effects

The present application provides a frequency domain resource allocation method, device and storage medium, which can calculate a SNR of each subchannel in the resource pool after obtaining a pre-configured resource pool and determine priority of each subchannel in the resource pool according to the SNR so as to select the subchannel with a highest priority from the resource pool as a frequency domain resource for PSSCH, thereby allocating the optimal frequency domain resource to PSSCH and improving transmission reliability.

DESCRIPTION OF DRAWINGS

The technical solutions and other beneficial effects of the present application will be more apparent with reference to the detailed descriptions of the embodiments of the present application below in accompanying with the drawings.

DESCRIPTION OF EMBODIMENTS OF THE INVENTION

The technical solutions in the embodiments of the present application are clearly and completely described below with reference to appending drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application.

Figure 1:
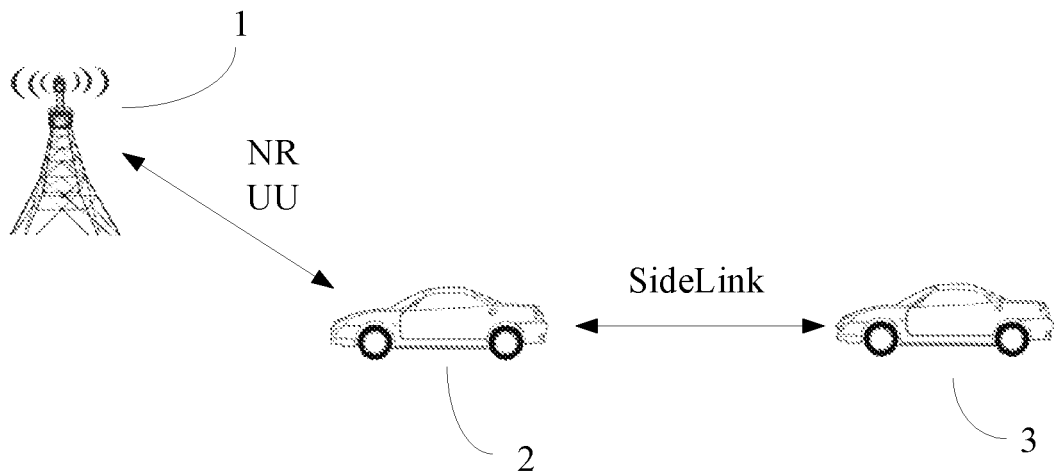
FIG. 1 is a structural schematic diagram illustrating a V2X system provided in an embodiment of the present application.

Refer to FIG. 1, which is a structural schematic diagram illustrating a V2X system. The V2X environment is divided into three situations due to different network coverage, namely, network coverage area, no network coverage area and partial network coverage area. The PC5 interface of Sidelink can be applied in these three situations, but for the NR UU interface there is no connection in the areas without network coverage and there may be no connection in the areas with partial network coverage. Therefore, as shown in FIG. 1, the V2X terminal 2 is located in an area with network coverage, and the base station (gNodeB) 1 is connected to the V2X terminal 2 via NR UU. The V2X terminal 3 is located in an area without network coverage, and the base station 1 cannot connect to the V2X terminal 3. However, the V2X terminal 2 can be connected to the V2X terminal 3 via Sidelink.

Figure 2:
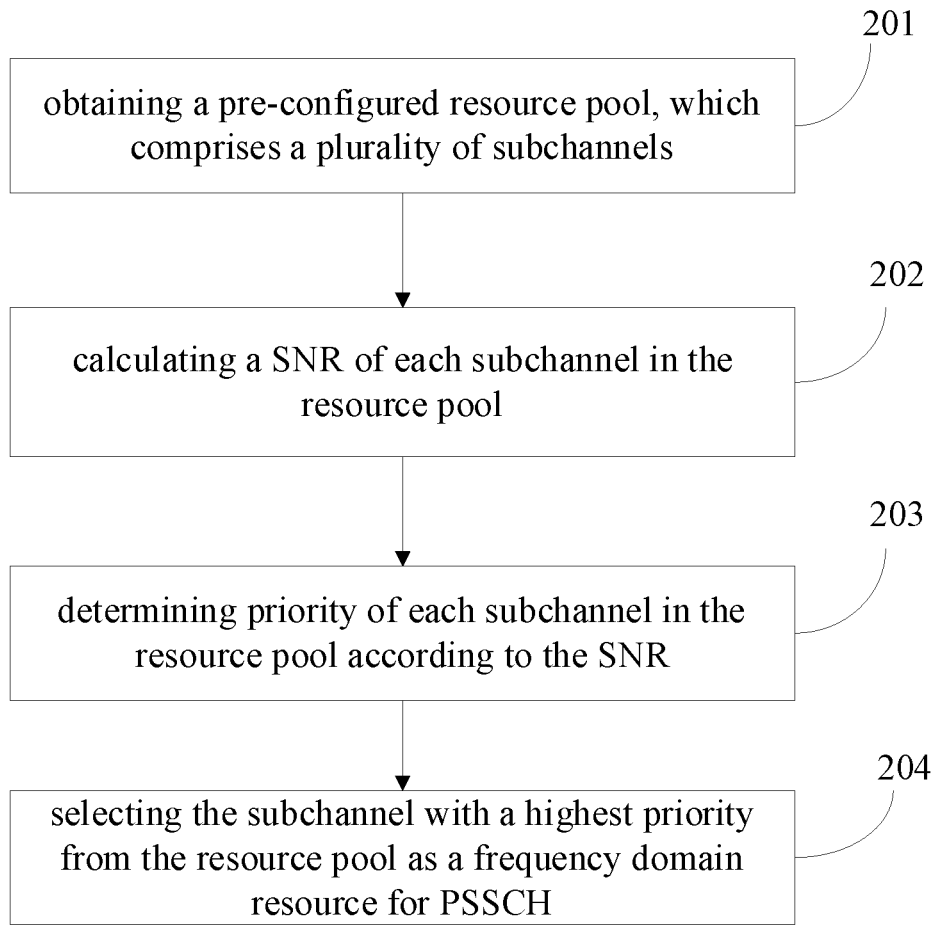
FIG. 2 is a schematic flowchart of a frequency domain resource allocation method provided in an embodiment of the present application.

Refer to FIG. 2, which is a schematic flowchart of a frequency domain resource allocation method provided in an embodiment of the present application. The frequency domain resource allocation method is applied to a V2X terminal. The flow of the frequency domain resource allocation method may be as follows:

201: obtaining a pre-configured resource pool, which includes a plurality of subchannels;

In an embodiment of the present application, the time domain resource of PSSCH is derived according to the timing of physical sidelink control channel (PSCCH), and the frequency domain resource of PSSCH is obtained according to a field of resource block assignment and hopping resource allocation in Sidelink control information (SCI). In an area without network coverage, the SCI in PSCCH specifies that the V2X terminal can only select the frequency domain resource of PSSCH from a pre-configured resource pool. The pre-configured resource pool can be configured by the base station when the V2X terminal is in an area with network coverage, or it can be configured in card.

Figure 3:
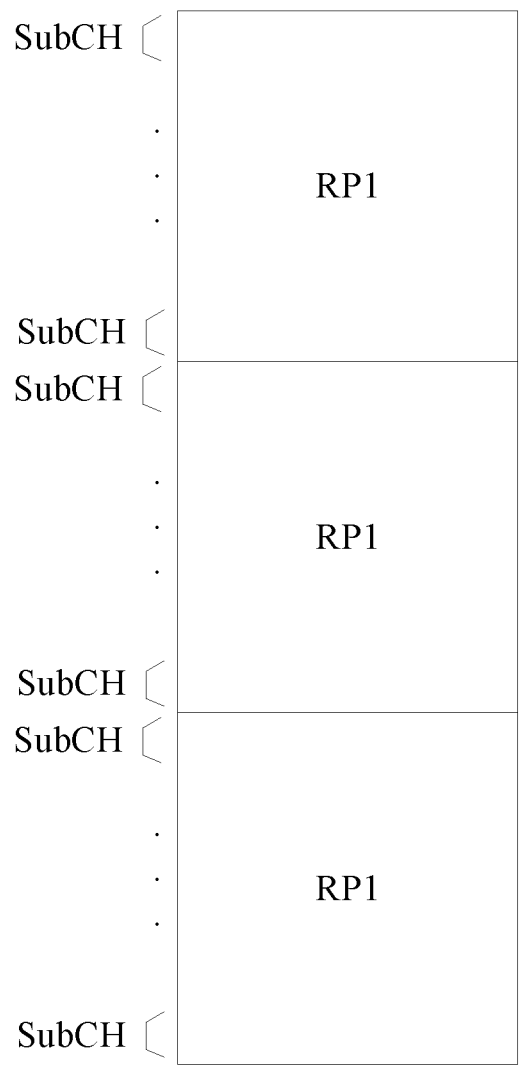
FIG. 3 is a schematic diagram illustrating a resource pool in a frequency domain resource allocation method provided in an embodiment of the present application.

The resource pool includes a plurality of subchannels, each subchannel consists of a group of consecutive resource blocks, and each resource block includes a plurality of subcarriers. The size of the subchannel is configured to the V2X terminal by the base station or pre-configured information. As shown in FIG. 3, there are a plurality of subchannels SubCH in each of three resource pools RP1, RP2, and RP3.

202: calculating a signal-to-noise ratio (SNR) of each subchannel in the resource pool;

In an embodiment of the present application, each subchannel includes a plurality of subcarriers. For a subchannel, Signal to Interference plus Noise Ratio (SINR) of each subcarrier in the subchannel can be calculated, and then signal-to-noise ratio (SNR) of the subchannel is calculated.

Specifically, the calculating the signal-to-noise ratio of each subchannel in the resource pool in Step 202 includes:

taking each subchannel of the resource pool as a target subchannel, and calculating a signal-to-interference-plus-noise ratio (SINR) of each subcarrier in the target subchannel; and calculating the SNR of the target subchannel according to the SINR of a plurality of subcarriers in the target subchannel.

It should be noted that the SINR is a ratio of signal to interference plus noise, that is, a ratio of the intensity of received expected signal to the intensity of received interference signal (noise and interference). The SINR of each subcarrier in the target subchannel can be calculated by the following formula:

$$SINR = \frac{S}{I+\delta},$$

wherein S is the expected signal, I is the interference, and δ is the noise.

The SINR of different subcarriers in the target subchannel may be different from each other. After obtaining the SINR of each subcarrier of the target subchannel, the V2X terminal can utilize a function to perform equivalent SNR mapping, that is, to map the SINR of all subcarriers in the target subchannel to a SNR, which is the SNR of the target subchannel.

Specifically, the calculating the SNR of the target subchannel according to the SINR of the plurality of subcarriers in the target subchannel includes:

mapping the SINR of the plurality of subcarriers in the target subchannel to the SNR of the target subchannel according to an equivalent SNR function.

The equivalent SNR function can be $$SNR_{\mathit{eff}} = \beta f^{-1}\left(\frac{1}{R}\sum_{r=1}^{R} f\left(\frac{SINR_r}{\beta}\right)\right),$$

where $SNR_{\mathit{eff}}$ is the SNR of the target subchannel, $f(x)$ is a compression function of the SNR mapping, $f^{-1}(x)$ is an inverse function of the compression function $f(x)$, R is the number of subcarriers in the target subchannel, $SINR_r$ is the SINR of a r-th subcarrier in the target subchannel, and β is an adjustment factor.

The compression function $f(x)$ of the SNR mapping can be various types of functions, such as exponential equivalent SNR mapping (EESM) and mutual information effective SNR mapping (MIESM). The compression function of EESM is $f(x)=\exp(-x)$, and the inverse function of EESM is $f^{-1}(-x)=-\ln x$. If the compression function of EESM is used, the equivalent SNR function can be:

$$SNR_{\mathit{eff}} = \beta \ln^{-1}\left(\frac{1}{R}\sum_{r=1}^{R} \exp\left(\frac{SINR_r}{\beta}\right)\right).$$

Since the compression function of EESM is low in computational complexity, the compression function of EESM is preferred in the embodiment of the present application so as to reduce the computational complexity of the SNR of the target channel, improve computational efficiency and further improve the efficiency of frequency division of the frequency domain resources.

The number R of the subcarriers in the target subchannel can be obtained from high-level configuration, and the adjustment factor β is an empirical value, which is related to channel model and modulation mode. The optimal adjustment factor β can be determined by the following formula:

$$\beta_{opt} = \underset{\beta}{\mathrm{argmin}}\left\{\sum_{i=1}^{N} |SINR_{AWGN,i} - SINR_{EESM,i}|^2\right\},$$

where $\beta_{opt}$ is the optimal adjustment factor, and N is the number of channels. $SINR_{AWGN,i}$ is SINR of i-th channel under Additive White Gaussian Noise (AWGN) and can be obtained by simulation. Specifically, in each channel model, it can be simulated to obtain a block error rate (BLER)-SINR curve for all channel states with channel quality indication (CQI). For the BLER of N channel states obtained in each channel model for a certain CQI, it can be queried to find the SINR corresponding to N channels for AWGN.

$SINR_{EESM,i}$ is the SINR of i-th equivalent channel state calculated according to the inverse function of the compression function of EESM. $SINR_{EESM,i}$ contains the adjustment factor β, and by minimizing $\sum_{i=1}^{N} |SINR_{AWGN,i} - SINR_{EESM,i}|^2$, the optimal adjustment factor $\beta_{opt}$ can be obtained.

In the embodiment of the present application, the optimal adjustment factor $\beta_{opt}$ is determined, and then the SNR of the target subchannel is calculated according to the optimal adjustment factor $\beta_{opt}$, thereby improving the accuracy of calculation on the SNR of the target subchannel, improving allocation of frequency domain resources and further improving the reliability of transmission.

203: determining priority of each subchannel in the resource pool according to the SNR; and In an embodiment of the present application, after the SNR of each subchannel in the resource pool is calculated, the priority of each subchannel can be set according to the amplitude of SNR of each subchannel.

Specifically, the determining the priority of each subchannel in the resource pool according to the SNR in Step 203 includes:

sorting the plurality of subchannels in the resource pool in descending order of the SNR; and setting the priorities of the plurality of subchannels in the resource pool in descending order of priorities according to the sorting.

It should be noted that the higher the SNR of the subchannel in the resource pool, the better the channel condition of the subchannel, and the higher the priority of the subchannel can be set. That is to say, the priority of the subchannel in the resource pool is set according to the amplitude of SNR of the subchannel, that is, the higher the SNR of the subchannel is, the higher the priority of the subchannel is, and the lower the SNR of the subchannel is, the lower the priority of the subchannel is.

204: selecting the subchannel with a highest priority from the resource pool as a frequency domain resource for physical sidelink shared channel (PSSCH).

In an embodiment of the present application, since the subchannel with high priority has better channel condition, the subchannel with great channel condition is preferentially selected, that is, the subchannel with high SNR is preferentially selected as frequency domain resource of PSSCH. This effectively improves the reliability of transmission.

Figure 4:
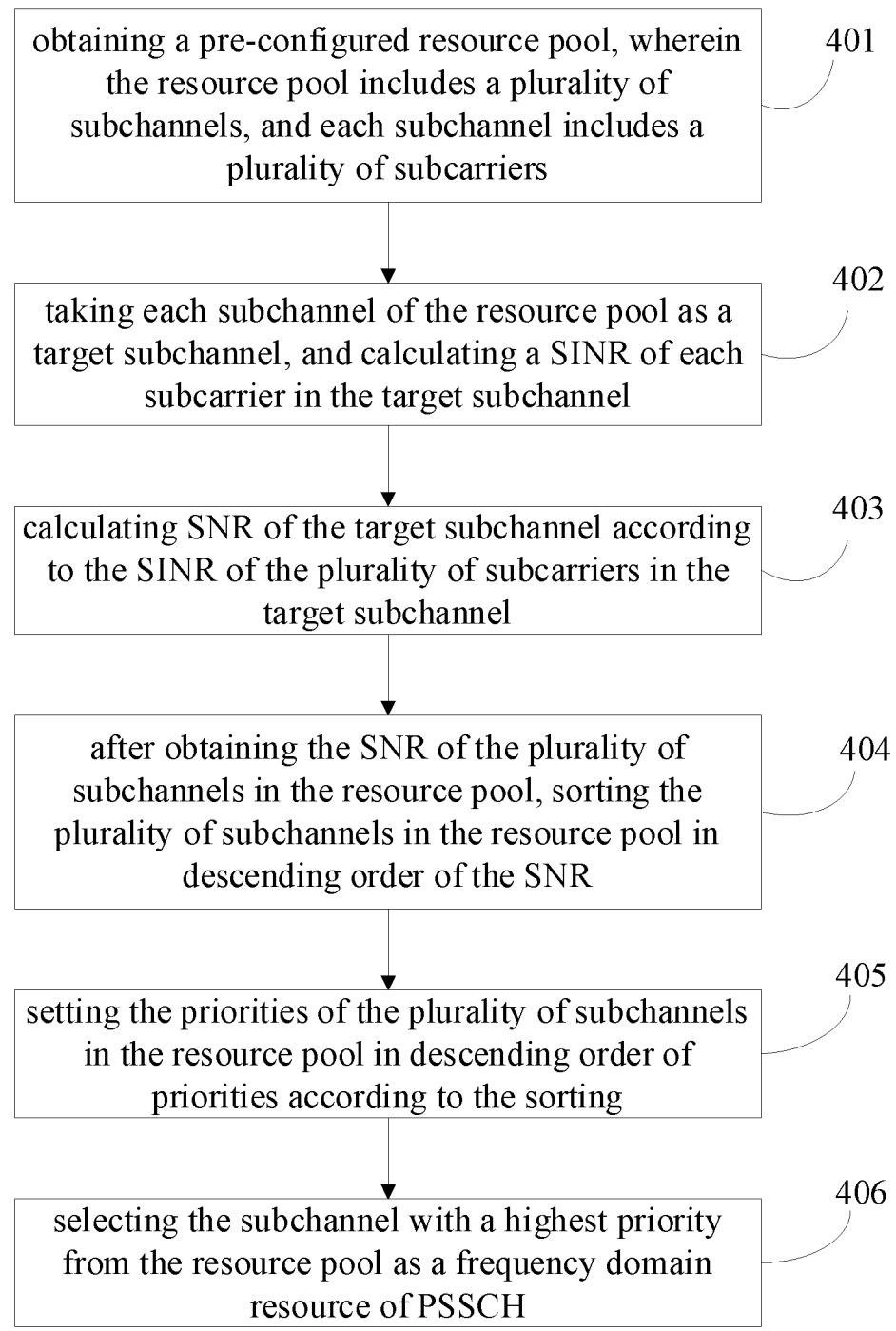
FIG. 4 is another schematic flowchart of a frequency domain resource allocation method provided in an embodiment of the present application.

Refer to FIG. 4, which is a schematic flowchart of a frequency domain resource allocation method provided in an embodiment of the present application. The frequency domain resource allocation method is applied to a V2X terminal. The flow of the frequency domain resource allocation method may be as follows:

401: obtaining a pre-configured resource pool, wherein the resource pool includes a plurality of subchannels, and each subchannel includes a plurality of subcarriers;

The frequency domain resource of PSSCH specified by SCI in PSCCH can only be selected from a pre-configured resource pool in the V2X terminal. For example, pre-configured resource pool A in the V2X terminal has M subchannels, and each subchannel has P subcarriers.

402: taking each subchannel of the resource pool as a target subchannel, and calculating a signal-to-interference-plus-noise ratio (SINR) of each subcarrier in the target subchannel.

For example, for any subchannel B in the resource pool A, the SINR of each subcarrier in the subchannel B is calculated so as to obtain the SINR of P subcarriers in the subchannel B.

403: calculating signal-to-noise ratio (SNR) of the target subchannel according to the SINR of the plurality of subcarriers in the target subchannel.

For example, the SNR of the subchannel B can be calculated according to the SINR of P subcarriers in the subchannel B to obtain the SNR of N subchannels in the resource pool A.

404: after obtaining the SNR of the plurality of subchannels in the resource pool, sorting the plurality of subchannels in the resource pool in descending order of the SNR.

For example, according to the amplitude of SNR of N subchannels in the resource pool A, the N subchannels are arranged from 1 to N in order, that is, the subchannel arranged in the first place has the largest SNR and the subchannel arranged in the N-th place has the smallest SNR.

405: setting the priorities of the plurality of subchannels in the resource pool in descending order of priorities according to the sorting.

For example, the priorities of N subchannels is set according to the order of N subchannels. The priorities of N subchannels are consistent with the order of N subchannels, that is, the subchannel arranged in the first place has the highest priority, and the subchannel arranged in the N-th place has the lowest priority.

406: selecting the subchannel with a highest priority from the resource pool as a frequency domain resource of PSSCH.

For example, among the sorted N subchannels, the subchannel arranged in the first place has the highest priority, and the subchannel arranged in the first place is selected as the frequency domain resource of PSSCH.

It can be seen from the above that the frequency domain resource allocation method provided in the present application can calculate a SNR of each subchannel in the resource pool after obtaining a pre-configured resource pool and determine priority of each subchannel in the resource pool according to the SNR so as to select the subchannel with a highest priority from the resource pool as a frequency domain resource for PSSCH, thereby allocating the optimal frequency domain resource to PSSCH and improving transmission reliability.

According to the methods described in above embodiments, this embodiment will be further described from the perspective of a frequency domain resource allocation device, and the frequency domain resource allocation device may be integrated in a V2X terminal.

Figure 5:
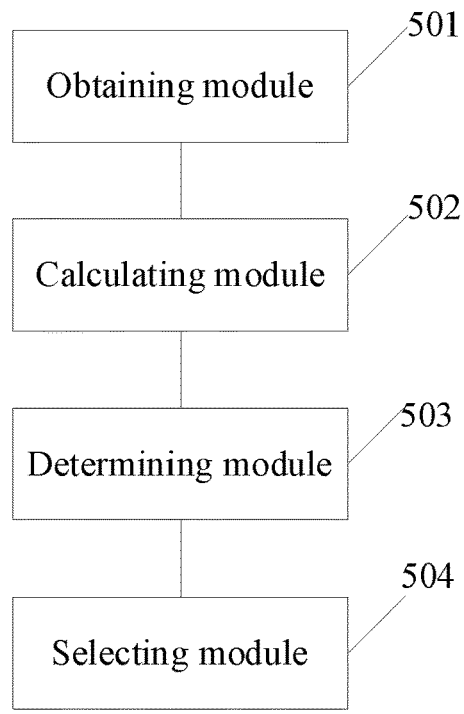
FIG. 5 is a structural schematic diagram illustrating a frequency domain resource allocation device provided in an embodiment of the present application.

Referring to FIG. 5, this figure illustrates a frequency domain resource allocation device provided in an embodiment of the present application. The frequency domain resource allocation may include an obtaining module 501, a calculating module 502, a determining module 503 and a selecting module 504.

(1) Obtaining Module 501

The obtaining module 501 is configured to obtain a pre-configured resource pool, which includes a plurality of subchannels.

In an area without network coverage, the SCI in PSCCH specifies that the V2X terminal can only select the frequency domain resource of PSSCH from a pre-configured resource pool. The pre-configured resource pool can be configured by the base station when the V2X terminal is in an area with network coverage, or it can be configured in card.

The resource pool includes a plurality of subchannels, each subchannel consists of a group of consecutive resource blocks, and each resource block includes a plurality of subcarriers.

(1) Calculating Module 502

The calculating module 502 is configured to calculate a signal-to-noise ratio (SNR) of each subchannel in the resource pool.

Each subchannel includes a plurality of subcarriers. For a subchannel, Signal to Interference plus Noise Ratio (SINR) of each subcarrier in the subchannel can be calculated, and then signal-to-noise ratio (SNR) of the subchannel is calculated.

(3) Determining Module 503

The determining module 503 is configured to determine priority of each subchannel in the resource pool according to the SNR.

After the SNR of each subchannel in the resource pool is calculated, the priority of each subchannel is set according to the amplitude of SNR of each subchannel.

(4) Selecting Module 504

The selecting module 504 is configured to select the subchannel with a highest priority from the resource pool as a frequency domain resource for physical sidelink shared channel (PSSCH).

Since the subchannel with high priority has better channel condition, the subchannel with great channel condition is preferentially selected, that is, the subchannel with high SNR is preferentially selected as frequency domain resource of PSSCH. This effectively improves the reliability of transmission.

Figure 6:
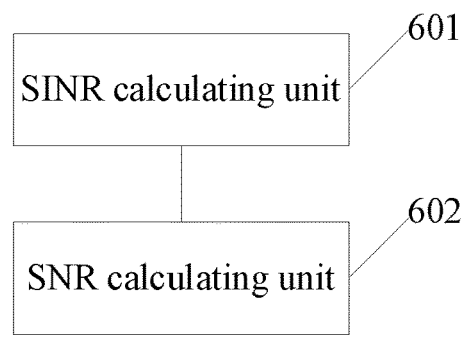
FIG. 6 is a structural schematic diagram illustrating a calculation module in a frequency domain resource allocation device provided in an embodiment of the present application.

In some embodiments of the present application, each subchannel includes a plurality of subcarriers. As shown in FIG. 6, the calculating module 502 includes:

a SINR calculating unit 601, configured to take each subchannel of the resource pool as a target subchannel and calculate a signal-to-interference-plus-noise ratio (SINR) of each subcarrier in the target subchannel; and a SNR calculating unit 602, configured to calculate the SNR of the target subchannel according to the SINR of a plurality of subcarriers in the target subchannel.

In some embodiments of the present application, the SNR calculating unit 602 is configured to:

map the SINR of the plurality of subcarriers in the target subchannel to the SNR of the target subchannel according to an equivalent SNR function.

In some embodiments of the present application, the equivalent SNR function is:

$$SNR_{\it{eff}} = \beta \ln^{-1}\left(\frac{1}{R}\sum_{r=1}^{R} \exp\left(\frac{SINR_r}{\beta}\right)\right),$$

wherein $SNR_{\it{eff}}$ is the SNR of the target subchannel, R is the number of subcarriers in the target subchannel, $SINR_r$ is the SINR of a r-th subcarrier in the target subchannel, and $\beta$ is an adjustment factor.

In some embodiments of the present application, the determining module 503 is configured to:

sort the plurality of subchannels in the resource pool in descending order of the SNR; and set the priorities of the plurality of subchannels in the resource pool in descending order of priorities according to the sorting.

It can be seen from the above that the frequency domain resource allocation device provided in the present application can calculate a SNR of each subchannel in the resource pool after obtaining a pre-configured resource pool and determine priority of each subchannel in the resource pool according to the SNR so as to select the subchannel with a highest priority from the resource pool as a frequency domain resource for PSSCH, thereby allocating the optimal frequency domain resource to PSSCH and improving transmission reliability.

Figure 7:
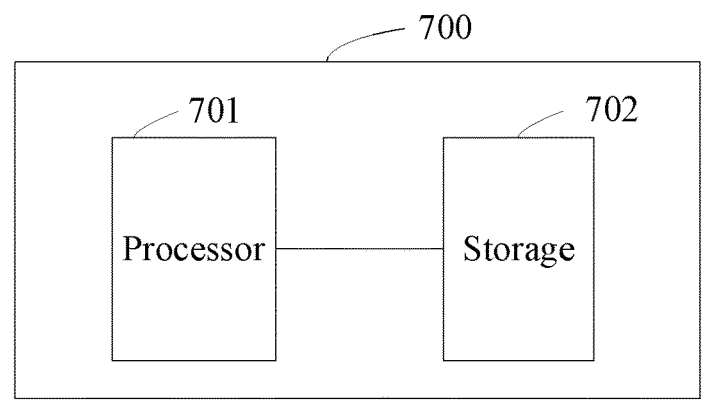
FIG. 7 is a structural schematic diagram illustrating a V2X terminal provided in an embodiment of the present application.

The embodiment of the present application further provides a V2X terminal. As shown in FIG. 7, the V2X terminal 700 includes a processor 701 and a storage 702. The processor 701 and the storage 702 are electrically connected to each other.

The processor 701 functions as a control center of the V2X terminal 700 and is configured to connect each component of the V2X terminal using various interfaces and circuits, and is configured to execute or load application programs stored in the storage 702, to call the data stored in the storage 702 and to execute various functions of the V2X terminal and perform data processing, thereby monitoring the overall V2X terminal.

In this embodiment, the obtaining module 501, the calculating module 502, the determining module 503 and the selecting module 504 shown in FIG. 7 may be application programs stored in the storage 702. The processor 701 of the V2X terminal 700 runs the obtaining module 501, the calculating module 502, the determining module 503 and the selecting module 504 stored in the storage 702 so as to achieve various functions. When executing the obtaining module 501, the processor 701 is configured to obtain a pre-configured resource pool, which includes a plurality of subchannels. When executing the calculating module 502, the processor 701 is configured to calculate a signal-to-noise ratio (SNR) of each subchannel in the resource pool. When executing the determining module 503, the processor 701 is configured to determine priority of each subchannel in the resource pool according to the SNR. When executing the selecting module 504, the processor 701 is configured to select the subchannel with a highest priority from the resource pool as a frequency domain resource for physical sidelink shared channel (PSSCH).

Figure 8:
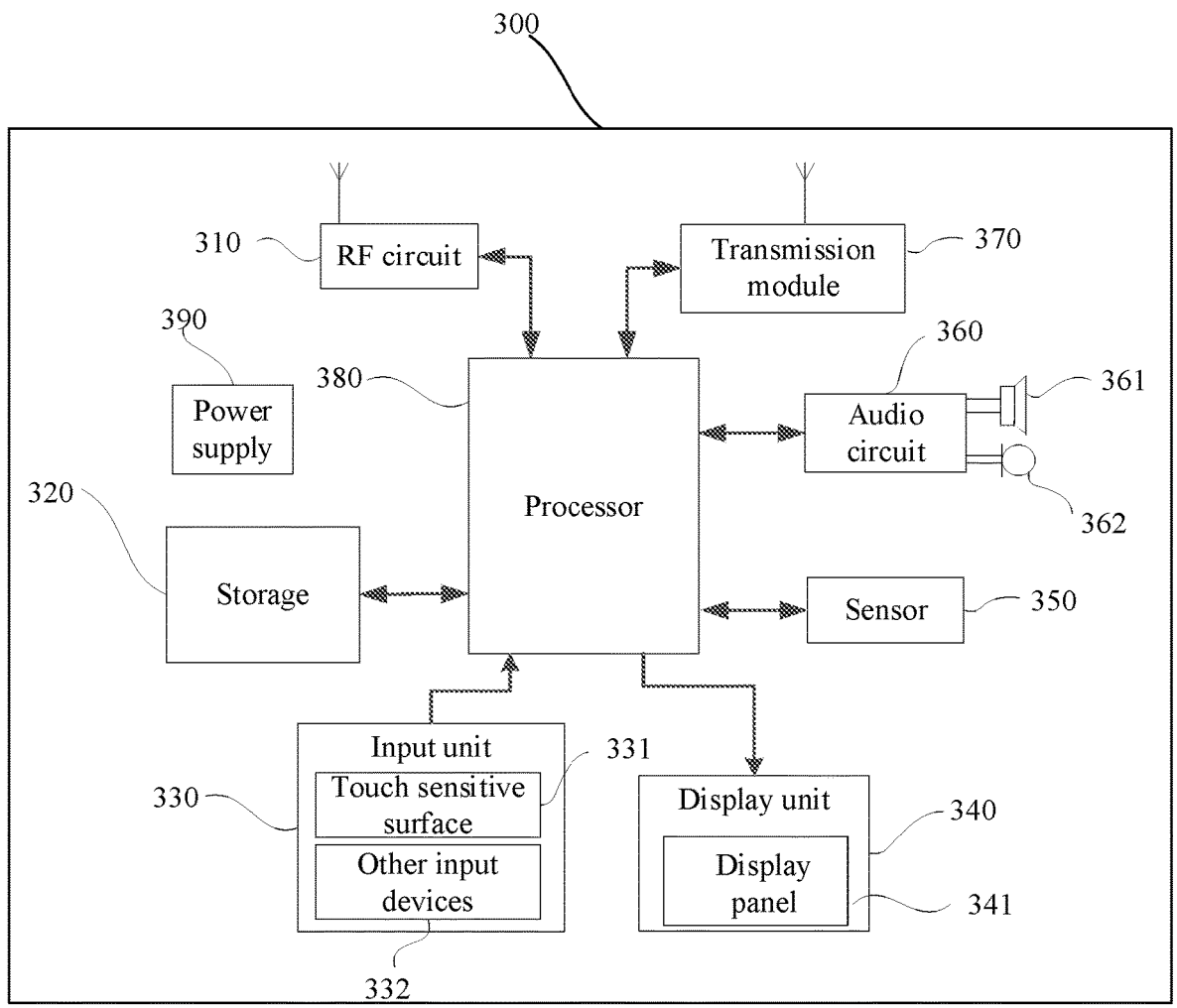
FIG. 8 is another structural schematic diagram illustrating a V2X terminal provided in an embodiment of the present application.

Refer to FIG. 8, which is a structural schematic diagram illustrating a V2X provided in an embodiment of the present application. The V2X terminal 300 may include a radio frequency (RF) circuit 310, a storage 320 including one or more than one computer-readable storage medium, an input unit 330, a display unit 340, a sensor 350, an audio circuit 360, a speaker 361, a microphone 362, and a transmission module 370, a processor 380 including one or more processing cores, a power supply 390 and other components. A person skilled in the art understands that the structure of the V2X terminal shown in FIG. 8 does not constitute a limitation to the V2X terminal, and may include more or less components than those illustrated in the drawings. Furthermore, some components of the V2X terminal can be combined and/or arranged in different ways other than that shown in FIG. 8.

The RF circuit 310 is configured to receive and transmit electromagnetic waves to implement conversion between the electromagnetic waves and electrical signals, thereby communicating with a communication network or any other device. The RF circuit 310 may include various existing circuit components for executing the functions, for example, an antenna, a cellular communication RF transceiver, a millimeter wave RF transceiver, a WIFI/BT transceiver, a GPS transceiver, a digital signal processor, an encryption/decryption chip, a subscriber identity module (SIM) card, a storage, and so on. The RF circuit 310 can communicate with various networks, such as internet, an intranet, or a wireless network, or can communicate with other devices via the wireless network. The above-mentioned wireless network may include a cellular network or a wireless local area network or metropolitan area network. The above-mentioned wireless network may use any one of communication standards, protocols, or technologies, including but not limited to Global System for Mobile communications (GSM), Enhanced Data GSM Environment (EDGE), Wideband Code Division Multiple Access (WCDMA), Code Division Multiple Access (CDMA), Time Division Multiple Access (TDMA), WIFI (such as standards of the Institute of Electrical and Electronics Engineers including IEEE802.11a, IEEE802.11b, IEEE 802.11g, and/or IEEE 802.11n), Voice over Internet Protocol (VoIP), Worldwide Interoperability for Microwave Access (Wi-Max), any other protocol for mails, instant communication, and short messages, any other suitable communication protocol, or any other protocol which has not been developed.

The storage 320 can be configured to store software programs and modules, such as the program instructions/modules corresponding to the frequency domain resource allocation device and method in above-mentioned embodiments. The processor 380 can perform various applications of functions and data processing by executing the software programs and modules stored in the storage 320 to implement the frequency domain resource allocation function. The storage 320 may include high-speed random access memory, and may further include non-volatile memory such as one or more disk storage devices, a flash memory, or other non-volatile solid state storage. In some embodiments, the storage 320 also includes a remote storage disposed corresponding to the processor 380. The remote storage may be linked to the V2X terminal 300 via a network. The network may include but not limited to at least one combination of internet, an intranet, a local area network, and a mobile communication network.

The input unit 330 can be configured to receive input numbers or character information, and generate signal input of a keyboard, a mouse, a joystick, or an optical trackball in relation to user settings and functional control. Specifically, the input unit 330 may include a touch sensitive surface 331 and any other input device 332. The touch sensitive surface 331, which is also called a touch screen or a touchpad, can gather a touch operation (for example, operations by use of a finger of a user, a stylus, and any other suitable object or attachment on or near the sensitive surface 331) applied on or near to the touch sensitive surface 331 by the user and drive a connected device according to preset programs. Optionally, the touch sensitive surface 331 may include a touch-sensitive device and a touch controller. The touch-sensitive device detects a direction of the user's touch, detects signals resulted from the touch operation, and transmits the signals to the touch controller. The touch controller receives information of the touch from the touch-sensitive device, converts it into a touch coordinate, further transmits the coordinate to the processor 380, and further receives and executes an instruction from the processor 380. Furthermore, the touch sensitive surface 331 may be implemented by utilizing capacitive, resistive, infrared, and surface acoustic wave technologies. In addition to the touch sensitive surface 331, the input unit 330 may further include any other input device 332. Specifically, the input device 332 may include but not limited to one or any of the combination of a physical keyboard, function keys (such as volume control keys, switch keys, etc.), a trackball, a mouse, and a joystick.

The display unit 340 may be configured to display information inputted by the user, information provided for the user, or various types of graphical user interfaces of the V2X terminal 300. The graphical user interfaces may include a graph, a text, an icon, a video, and any combination of them. The display unit 340 may include a display panel 341, optionally, which may be a liquid crystal display (LCD) or an Organic Light-Emitting Diode (OLED) display. Furthermore, the touch sensitive surface 331 may cover the display panel 341. When the touch sensitive surface 331 detects a touch operation on or near the touch sensitive surface 331 and transmits a corresponding signal to the processor 380 to determine a type of the touch event, the processor 380 controls the display panel 341 to provide appropriate visual output according to the type of the touch event. Although the touch sensitive surface 331 and the display panel 341 in FIG. 8 are two separate components for implementing input and output functions, the touch sensitive surface 331 and the display panel 341 may be integrated into one component for implementing the input and output functions in some embodiments.

The V2X terminal 300 may further include at least one sensor 350, such as a light sensor, a motion sensor, and other sensors. Specifically, the light sensor can include an ambient light sensor and a proximity sensor. The ambient light sensor can adjust the brightness of the display panel 341 according to bright or dark as to the ambient light. The proximity sensor can turn off the display panel 341 and/or the backlight when the V2X terminal 300 is moved close to ears. As one type of the motion sensor, a gravity sensor (G-sensor) can detect acceleration speed on all directions (generally up to three axis), can detect magnitude and direction of the gravity when it stays still, and can identify a gesture in a terminal application (such as a screen switch between landscape style and portrait style, relevant games, and magnetometer calibration) and recognize vibration patterns to identify relevant functions (such as pedometer, and knock), and so on. Additionally, a gyroscope, a barometer, a hygrometer, a thermometer, an infrared sensor, and any other sensor can be deployed in the V2X terminal 300, and the details for these are not repeated herein.

The audio circuit 360, the speaker 361 and the microphone 162 can provide an audio interface between the user and the V2X terminal 300. The audio circuit 360 converts received audio data to an electrical signal and transmits the electrical signal to the speaker 361. The speaker 361 converts the electrical signal to sound signals and outputs the sound signals. In addition, the microphone 362 converts collected sound signal to an electrical signal. The audio circuit 360 converts the electrical signal to audio data and transmits the audio data to the processor 380 for further processing. After the processing, the audio data may be transmitted to another terminal via the RF circuit 310, or transmitted to the storage 320 for further processing. The audio circuit 360 may further include an earphone jack for providing communication between an external earphone and the V2X terminal 300.

The V2X terminal 300 can be configured to, by the transmission module 370 (such as a WIFI module), send and receive emails, browse a webpage, and access to streaming media, and so on. It provides the user with wireless broadband internet access. It should be understood that although the transmission module 370 is illustrated in FIG. 7, this module is not an essential component for the V2X terminal 300 and can be omitted according to needs without departing from the scope of the present invention.

The processor 380 functions as a control center of the terminal 300 and is configured to connect each component of the whole UAV using various interfaces and circuits, and is configured to execute the various functions of the V2X terminal 300 and to perform data processing by running or executing the software programs and/or modules stored in the storage 320 and calling the data stored in the storage 320, thereby realizing overall monitoring over the terminal. Optionally, the processor 380 can include one or more processing cores. In some embodiments, an application processor and a modulation/demodulation processor can be integrated to form the processor 380. The application processor is primarily configured to process an operating system, user interfaces, application programs, and so on. The modulation/demodulation processor is primarily configured to process wireless communication. It should be understood that the modulation/demodulation processor can be independent from the processor 380.

The V2X terminal 300 further includes the power supply 190 (e.g., a battery) configured to provide power for the various components of the V2X terminal 300. In some embodiments, the power supply can be logically coupled to the processor 380 via a power management system that controls charging, discharging, power consumption, and so on. The power supply 390 may further include one or more direct current (DC)/or alternating current (AC) power sources, recharging system, power failure detection circuit, power converter or inverter, power supply status indicator, and the like.

Although not being shown, the V2X terminal 300 may include a camera (such as a front camera and a rear camera), a BLUETOOTH module, and so on. They are not repeated herein. Specifically, in this embodiment, the display unit of the V2X terminal is a touch screen display, and the V2X terminal also includes the storage 320. The obtaining module 501, the calculating module 502, the determining module 503 and the selecting module 504 shown in FIG. 7 can be application programs stored in the storage 302. The processor 380 of the V2X terminal 700 runs the obtaining module 501, the calculating module 502, the determining module 503 and the selecting module 504 stored in the storage 320 so as to achieve various functions. When executing the obtaining module 501, the processor 701 is configured to obtain a pre-configured resource pool, which includes a plurality of subchannels. When executing the calculating module 502, the processor 701 is configured to calculate a signal-to-noise ratio (SNR) of each subchannel in the resource pool. When executing the determining module 503, the processor 701 is configured to determine priority of each subchannel in the resource pool according to the SNR. When executing the selecting module 504, the processor 701 is configured to select the subchannel with a highest priority from the resource pool as a frequency domain resource for physical sidelink shared channel (PSSCH).

During specific implementation, the foregoing modules may be implemented as independent entities, or may be implemented as one or more entities through random combination. For specific implementation of the foregoing modules, refer to the above method embodiments, and details are not described herein again.

A person of ordinary skill in the art may understand that all or some of the steps in various methods of the foregoing embodiments may be implemented by program instructions, or may be implemented by a program instructing relevant hardware. The program instructions may be stored in a computer readable storage medium, and be loaded and executed by a processor. For this, an embodiment of the present embodiment provides a storage medium, which stores a plurality of instructions that can be loaded by the processor to execute the steps of any of the frequency domain resource allocation methods provided in the embodiments of the present application.

The storage medium may include a read only memory (ROM), a random access memory (RAM), a magnetic disk or an optic disc.

Since the program instructions stored in the storage medium can execute the steps of any of the frequency domain resource allocation methods provided in the embodiments of the present invention, it can realize the beneficial effects achieved by any of the frequency domain resource allocation methods provided in the embodiments of the present invention, which are referred to above embodiments and are not repeated herein.

Implementation of above operations may refer to above embodiments, and is not repeated herein.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

The invention claimed is:

1. A frequency domain resource allocation method, applied to a Vehicle-to-X (V2X) terminal, the method comprising:

obtaining a pre-configured resource pool, which comprises a plurality of subchannels;

calculating a signal-to-noise ratio (SNR) of each subchannel in the resource pool;

determining priority of each subchannel in the resource pool according to the SNR; and selecting the subchannel with a highest priority from the resource pool as a frequency domain resource for physical sidelink shared channel (PSSCH);

wherein each subchannel comprises a plurality of subcarriers;

the calculating the signal-to-noise ratio of each subchannel in the resource pool comprises:

taking each subchannel of the resource pool as a target subchannel, and calculating a signal-to-interference-plus-noise ratio (SINR) of each subcarrier in the target subchannel; and calculating the SNR of the target subchannel according to the SINR of a plurality of subcarriers in the target subchannel;

wherein the calculating the SNR of the target subchannel according to the SINR of the plurality of subcarriers in the target subchannel comprises:

mapping the SINR of the plurality of subcarriers in the target subchannel to the SNR of the target subchannel according to an equivalent SNR function;

wherein the equivalent SNR function is:

$$SNR_{eff} = \beta \ln^{-1}\left(\frac{1}{R}\sum_{r=1}^{R} \exp\left(\frac{SINR_r}{\beta}\right)\right);$$

wherein $SNR_{eff}$ is the SNR of the target subchannel, R is the number of subcarriers in the target subchannel, $SINR_r$ is the SINR of a r-th subcarrier in the target subchannel, and $\beta$ is an adjustment factor.

2. The frequency domain resource allocation method of claim 1, wherein the determining the priority of each subchannel in the resource pool according to the SNR comprises:
  sorting the plurality of subchannels in the resource pool in descending order of the SNR; and
  setting the priorities of the plurality of subchannels in the resource pool in descending order of priorities according to the sorting.

3. The frequency domain resource allocation method of claim 1, wherein the higher the SNR of the subchannel is, the higher the priority of the subchannel is, and the lower the SNR of the subchannel is, the lower the priority of the subchannel is.

4. A frequency domain resource allocation device, applied to a Vehicle-to-X (V2X) terminal, the device comprising:
  an obtaining module, configured for obtaining a pre-configured resource pool, which comprises a plurality of subchannels;
  a calculating module, configured for calculating a signal-to-noise ratio (SNR) of each subchannel in the resource pool;
  a determining module, configured for determining priority of each subchannel in the resource pool according to the SNR; and
  a selecting module, configured for selecting the subchannel with a highest priority from the resource pool as a frequency domain resource for physical sidelink shared channel (PSSCH);
  wherein each subchannel comprises a plurality of subcarriers;
  the calculating module comprises:
  a SINR calculating unit, configured for taking each subchannel of the resource pool as a target subchannel, and calculating a signal-to-interference-plus-noise ratio (SINR) of each subcarrier in the target subchannel; and
  a SNR calculating unit, configured for calculating the SNR of the target subchannel according to the SINR of a plurality of subcarriers in the target subchannel;
  wherein the SNR calculating unit is configured for:
  mapping the SINR of the plurality of subcarriers in the target subchannel to the SNR of the target subchannel according to an equivalent SNR function;
  wherein the equivalent SNR function is:

$$SNR_{eff} = \beta \ln^{-1}\left(\frac{1}{R}\sum_{r=1}^{R} \exp\left(\frac{SINR_r}{\beta}\right)\right);$$

wherein $SNR_{eff}$ is the SNR of the target subchannel, R is the number of subcarriers in the target subchannel, $SINR_r$ is the SINR of a r-th subcarrier in the target subchannel, and $\beta$ is an adjustment factor.

5. The frequency domain resource allocation device of claim 4, wherein the determining module is configured for:
  sorting the plurality of subchannels in the resource pool in descending order of the SNR; and setting the priorities of the plurality of subchannels in the resource pool in descending order of priorities according to the sorting.

6. The frequency domain resource allocation device of claim 4, wherein the higher the SNR of the subchannel is, the higher the priority of the subchannel is, and the lower the SNR of the subchannel is, the lower the priority of the subchannel is.

7. A non-transitory computer readable storage medium, wherein the storage medium stores a plurality of instructions applicable to be loaded by a processor to execute the following steps:
  obtaining a pre-configured resource pool, which comprises a plurality of subchannels;
  calculating a signal-to-noise ratio (SNR) of each subchannel in the resource pool;
  determining priority of each subchannel in the resource pool according to the SNR; and
  selecting the subchannel with a highest priority from the resource pool as a frequency domain resource for physical sidelink shared channel (PSSCH);
  wherein each subchannel comprises a plurality of subcarriers;
  when executing the calculating the signal-to-noise ratio of each subchannel in the resource pool, the processor executes the steps of:
  taking each subchannel of the resource pool as a target subchannel, and calculating a signal-to-interference-plus-noise ratio (SINR) of each subcarrier in the target subchannel; and
  calculating the SNR of the target subchannel according to the SINR of a plurality of subcarriers in the target subchannel;
  wherein when executing the calculating the SNR of the target subchannel according to the SINR of the plurality of subcarriers in the target subchannel, the processor executes the step of:
  mapping the SINR of the plurality of subcarriers in the target subchannel to the SNR of the target subchannel according to an equivalent SNR function;
  wherein the equivalent SNR function is:

$$SNR_{eff} = \beta \ln^{-1}\left(\frac{1}{R}\sum_{r=1}^{R} \exp\left(\frac{SINR_r}{\beta}\right)\right);$$

wherein $SNR_{eff}$ is the SNR of the target subchannel, R is the number of subcarriers in the target subchannel, $SINR_r$ is the SINR of a r-th subcarrier in the target subchannel, and $\beta$ is an adjustment factor.

8. The non-transitory computer readable storage medium of claim 7,
  wherein when executing the determining the priority of each subchannel in the resource pool according to the SNR, the processor executes the steps of:
  sorting the plurality of subchannels in the resource pool in descending order of the SNR; and
  setting the priorities of the plurality of subchannels in the resource pool in descending order of priorities according to the sorting.

9. The non-transitory computer readable storage medium of claim 7, wherein the higher the SNR of the subchannel is, the higher the priority of the subchannel is, and the lower the SNR of the subchannel is, the lower the priority of the subchannel is.

* * * * *